United States Patent [19]

Wilson et al.

[11] 4,413,326

[45] Nov. 1, 1983

[54] FLOATING POINT DIVISION CONTROL

[75] Inventors: Troy K. Wilson; Robert J. Handly, both of Phoenix, Ariz.

[73] Assignee: Honeywell Inc., Minneapolis, Minn.

[21] Appl. No.: 952,567

[22] Filed: Oct. 18, 1978

[51] Int. Cl.³ .............................................. G06F 7/52
[52] U.S. Cl. .................................... 364/748; 364/761
[58] Field of Search ............................... 364/748, 761

[56] References Cited

U.S. PATENT DOCUMENTS

| | | | |
|---|---|---|---|
| 3,697,734 | 10/1972 | Booth et al. | 364/748 |
| 3,777,132 | 12/1973 | Bennett, Jr. | 364/748 |
| 4,075,704 | 2/1978 | O'Leary | 364/748 |
| 4,130,879 | 12/1978 | Cushing | 364/748 |

OTHER PUBLICATIONS

Jeremiah et al., "Floating Point Multiply/Divide Assist", *IBM Tech. Disclosure Bulletin,* vol. 20, No. 5, Oct. 1977, pp. 1726-1727.

*Primary Examiner*—David H. Malzahn
*Attorney, Agent, or Firm*—Lockwood D. Burton; L. J. Marhoefer; Edward W. Hughes

[57] ABSTRACT

An improved means and method for accomplishing floating point calculations in computational apparatus includes a primary microprocessor and a secondary microprocessor, each with its own control ROM. The normal or fixed point calculations are handled by the primary microprocessor under the control of a first segment of the associated control ROM. When a floating point calculation is called for, a second segment of that ROM is addressed. The addressing of the second segment of the first ROM also effects the coincident addressing of the ROM of the secondary microprocessor. For floating point calculations, the exponent portion of the numbers being manipulated is handled by the primary microprocessor. Simultaneously therewith, the mantissa portion of the numbers being manipulated is handled by the secondary microprocessor under the control of its associated control ROM. The resultant calculations are recombined in the primary microprocessor to produce a complete solution for the floating point calculation. In executing a division operation, the mantissas are preconditioned to be normalized, the most significant bit being a logical "1". The divide routine shifts and subtracts repeatedly until the most significant bit in an accumulating register is also a logical "1", thus eliminating the need for a preset counter and the associated control functions.

1 Claim, 2 Drawing Figures

FLOATING POINT DIVISION CONTROL

BACKGROUND OF THE INVENTION

The present invention relates to computer technology. More particularly, it relates to improved means and method for performing a divisional operation in accordance with floating point calculations and the computational operation of a computer.

In computer structures which have been provided heretofore, there has been provided a primary arithmetic unit, a memory unit, bus control units and input/output control units all tied together by a so-called CPU bus, a multiconductor bus in conventional architecture. In order to accomplish floating point capability, a separate arithmetic unit was added and tied into the system by way of the bus. That arrangement has the disadvantage of involving the bus control unit to determine the addressing of the floating point unit. Such an arrangement means that the primary arithmetic unit was idled while the floating point unit had completed its manipulations. Such an arrangement unduly complicates the structure of the system and, of necessity, slows down the operation of the system.

In performing a divisional operation, a counter was preset with a number representative of the number of significant digits in the numbers being manipulated. That counter will then be incremented on each division step until the incremented number equalled the preset number whereby to assure that the division had been carried out to the extent commensurate with the number of significant digits in the numbers being manipulated.

SUMMARY OF THE INVENTION

It is, accordingly, an object of the present invention to provide an improved means and method for executing a division operation in a floating point calculation.

It is another object of the present invention to provide an improved means and method for effecting a division operation, as set forth, without the use of a preset counter and the associated control circuitry.

In accomplishing these and other objects, there has been provided, in accordance with the present invention, an improved computational apparatus wherein a central processing unit has the usual complement of a memory and a bus control, an arithmetic logic unit with its associated registers, a control ROM having associated control instruction register. There is provided an additional arithmetic logic unit having its associated registers at a control ROM with its associated control instruction register. The second ALU is connected as an adjunct to the primary ALU and does not communicate therewith by way of the CPU bus but is, rather, internally connected as an extention of the primary ALU. The control ROM of the primary ALU is divided into two segments, the first segment being devoted to the normal or fixed point operation of the primary ALU. The second segment is devoted to the operation of the floating point calculations. The control ROM of the auxiliary ALU is addressed only when the second segment of the primary control ROM is addressed and is constructed as a bit-extension to increase the effective word length of the addresses in the second segment of the primary control ROM. While the computer is operating in its normal mode and there arises an occasion for the handling of a floating point calculation, the second segment of the control ROM of the primary ALU and, hence, the control ROM of the auxiliary ALU, is addressed. The mathmatical values to be manipulated in accordance with the floating point calculations is expressed in terms of so-called scientific notation, that is, $M \times 2^{nth}$. The exponent portions of the calculation are processed by the primary ALU while the mantissa of the mathmetical expression is manipulated in the auxiliary ALU, both operations may be carried out simultaneously. The result of the two manipulations in then recombined in the primary ALU with the output thereof stored in a suitable register.

When the mathmatical manipulation to be executed is one of division, only the mantissas are subject to the division operation, this being carried out in the auxiliary ALU. The mantissa information is preconditioned to be normalized, the most significant digit being a logical 1. As each divisional manipulation is accomplished, the quotient digit is stored in an accumulating register and shifted to the left. When a logical 1 appears in the position designated as the most significant position in the accumulator register, the division will have been carried out to an extent commensurate with the significant digits of the numbers being manipulated. This will have been accomplished without the use of a preset counter.

BRIEF DESCRIPTION OF THE DRAWINGS

A better understanding of the invention may be had from the following detailed description when read in the light of the accompanying drawings in which.

DETAILED DESCRIPTION

Figure 1:
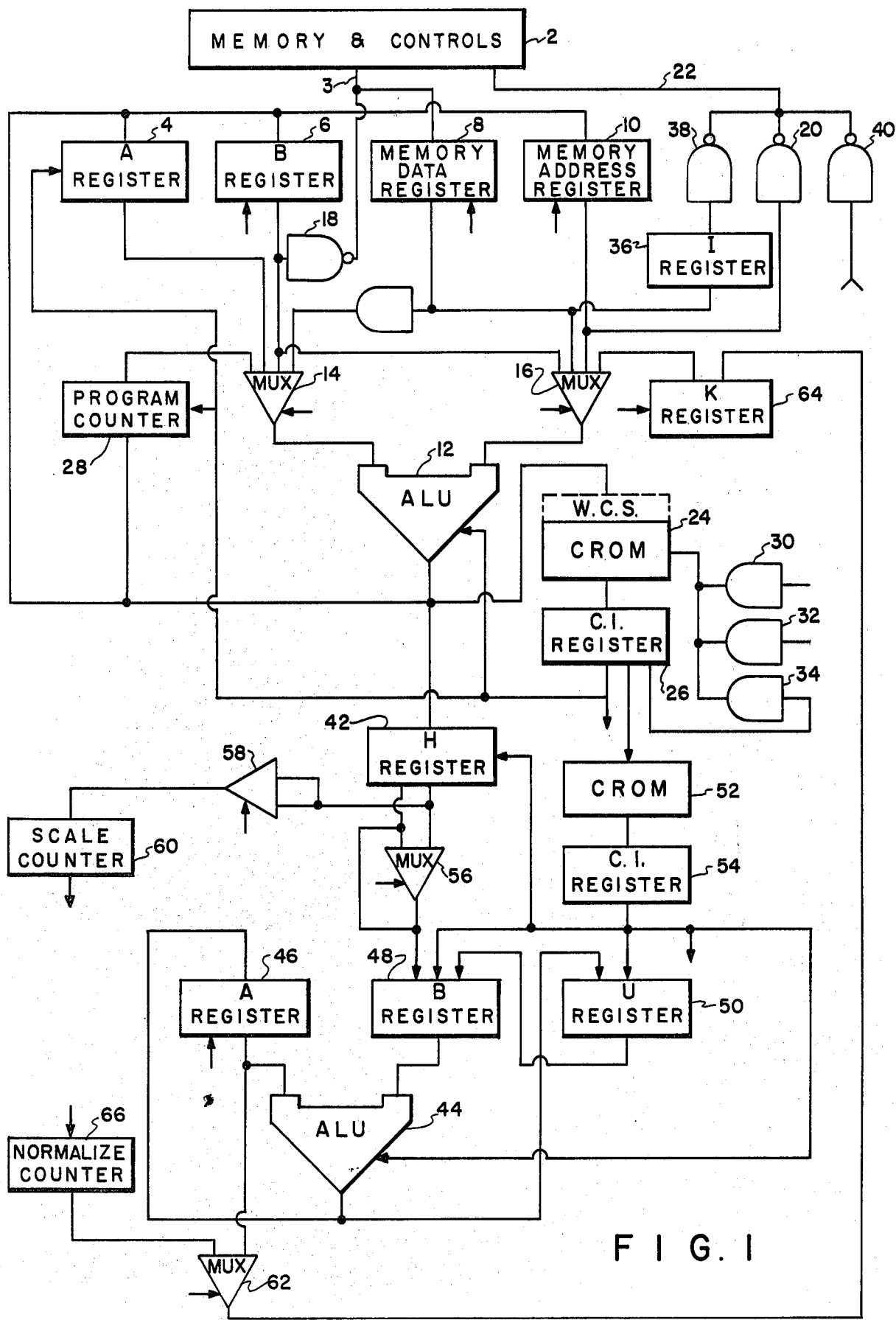
FIG. 1 is a schematic logic block diagram of a portion of the computer system embodying the present invention.

Referring now to the drawing in more detail, there is shown in FIG. 1, in block diagram form, a portion of a computer system including a memory and control unit 2 which includes the main memory of the computer. The memory in control unit 2 is connected by a suitable memory bus means 3 to the operating portions of the computational network. These include an A register 4, a B register 6, a Memory Data register 8, and a Memory Address register 10. An arithmetic logic unit 12 has an output connected to the input of the A register 4, the B register 6, and the memory address register 10. The output of the A register 4 is connected through a first multiplexer 14 to one input of the arithmetic logic unit (ALU) 12. The output of the B register 6 is also connected through the multiplexer 14 to the first input of the ALU 12. The output of the B register 6 further applied to one input means of a second multiplexer 16, the output of which is connected to the second input of the ALU 12. The output of the B register 6 is also connected, through an inverter means 18 to the memory data bus 3 connected to the memory and control unit 2. The memory data register 8 has its input directly connected to the memory data bus 3 and it output connected to the input of the second multiplexer 16. The memory address register 10 has its output connected to the input of the multiplexer 16 and to the input of the memory address gating means 20. The output of the memory address gating means 20 is connected to the memory address bus 22.

A control ROM 24 has an output connected to a control instruction register 26. The control instruction register 26 has output connections to control the operation of the ALU 12, the A register 4, the B register 6, the Memory Data register 8, and the Memory Address 10. The control ROM 24, in an exemplary embodiment constructed in accordance with the present invention, is a memory unit with addressable words, each 48 bits in length. The first 1024 of the control words in the control ROM 24 are used for the normal or fixed point operation of the ALU 12 and its associated components. The next 512 control words of the control ROM 24 are devoted to floating point calculations.

The control ROM 24 also includes a writable control storage which has an input connected to the output of the ALU 12. The output of the ALU 12 is connected to a program counter 28 which is also operated under controlled instructions from the output of the control instruction register 26. An output from the program counter is applied to the input of the first multiplexer 14. A casing gating assembly includes a first gating means 30, a second gating means 32, and a third gating means 34 and is connected to input control for the control ROM 24. The gating means 30 receives signals from the Memory Address register 10, the gating means 32 receives signals from the memory data register 8, and the gating means 34 receives sequencing signals from the control instruction register 26.

The output of the Memory Data register 8 is also connected through an I register 36; thence through a gating means 38 to the Memory Address bus 22. A third gating means 40 receives an input signal from the control instruction register 26. The output of the gating means 40 is also connected to the Memory Address bus 22.

An output from the ALU 12 is connected as an input to an H register 42 which is an input register for a second microprocessor circuit. The second microprocessor circuit includes a second or auxiliary ALU 44. An A register 46 has an output connected to one of the inputs of the ALU 44. A B register 48 has its output connected to the other input of the ALU 44. A U register 50 has an input connected to the output of the ALU 44 and an output which is connected to the input of the B register 48. Additionally, the output of the control instruction register 54 is effective to control the operation of the H register 42. The output of the H register 42 is connected through a multiplexer 56 to the input of the B register 48. The output of the H register 42 is also connected through a buffer 58 to a scale counter 60. The scale counter 60 controls the scaling of quantities in the auxiliary microprocessor in the performance of certain of the manipulations of those quantities.

The output of the A register 46 is also applied to the input of a multiplexer 62, the output of which is connected to an input of a K register 64 in the primary microprocessor unit. The output of the K register is applied to the input of the multiplexer 16. The K register 64, too, is operated under control of the output of the control instruction register 26.

A Normalized counter 66 is operated under the control of the output of the control instruction register 54 and has an output connected to the input of the multiplexer 62.

In the operation of the system, the primary ALU 12 with its associated components performs the normal operations of the ALU in a conventional manner. Those operations are under the control of the first 1024 words in the control ROM 24. When, however, an operation is called for in the course of carrying out a programmed series of steps which requires a floating point manipulation, the remaining 512 words of the control ROM 24 are addressed. With the interconnection of the control ROM 24 and the control ROM 52, the addressing of the other 512 words of the control ROM 24 addresses the corresponding 512 words of the control ROM 52. As was noted before, each of the addressable words in the control ROM 24, in the exemplary embodiment, is 48 bits in length. Similarly, each of the addressable words in the control ROM 52 is 16 bits in length.

Under the control of these two control ROMs and with the values they manipulate expressed in terms of scientific notation, the exponent portion of those numbers or values is controlled to be manipulated in the ALU 12 while the mantissa portion of the numbers is manipulated in the ALU 44. The actual numbers to be manipulated by the ALU 44 are translated from the output of the ALU 12 to the H register 42 into the B register 48 with a first number being transferred through the ALU to the A register, while the second number to be manipulative is stored in the B register. The manipulated control of the numbers in the ALU 44 is in accordance with the control instructions stored in the control ROM 52. The resultant of the manipulation of the numbers by the ALU 44 is stored in the U register 50. The output lead from the U register to the B register is a multiconductor lead and transfers the entire content of the U register in parallel into the B register, again under the control of instructions from the control ROM 52 through the control instruction register 54. When the manipulations in the ALU 44 have been completed, the manipulated mantissa is stored in the A register 46.

While the mantissas were being manipulated in the ALU 44, the exponents of the numbers were simultaneously being manipulated in the ALU 12. When the manipulations of the exponent portions of the numbers is completed in the ALU 12, the quotient manipulation of the mantissa in the A register is transmitted through a multiplexer tube 62 to the input of the K register 64. The output of the K register 64 is applied through the multiplexer 16 to the second input of the ALU 12; the manipulated exponent portion of the numbers will be applied from the A register 4 through the multiplexer 14 to the first input of the ALU 12 where the two numbers are combined into a composite number. The resulting composite number may then be stored in either the A register 4 or the B register 6 depending on whether the number is to be used as a part of another manipulation or is to be stored in the main memory.

Figure 2:
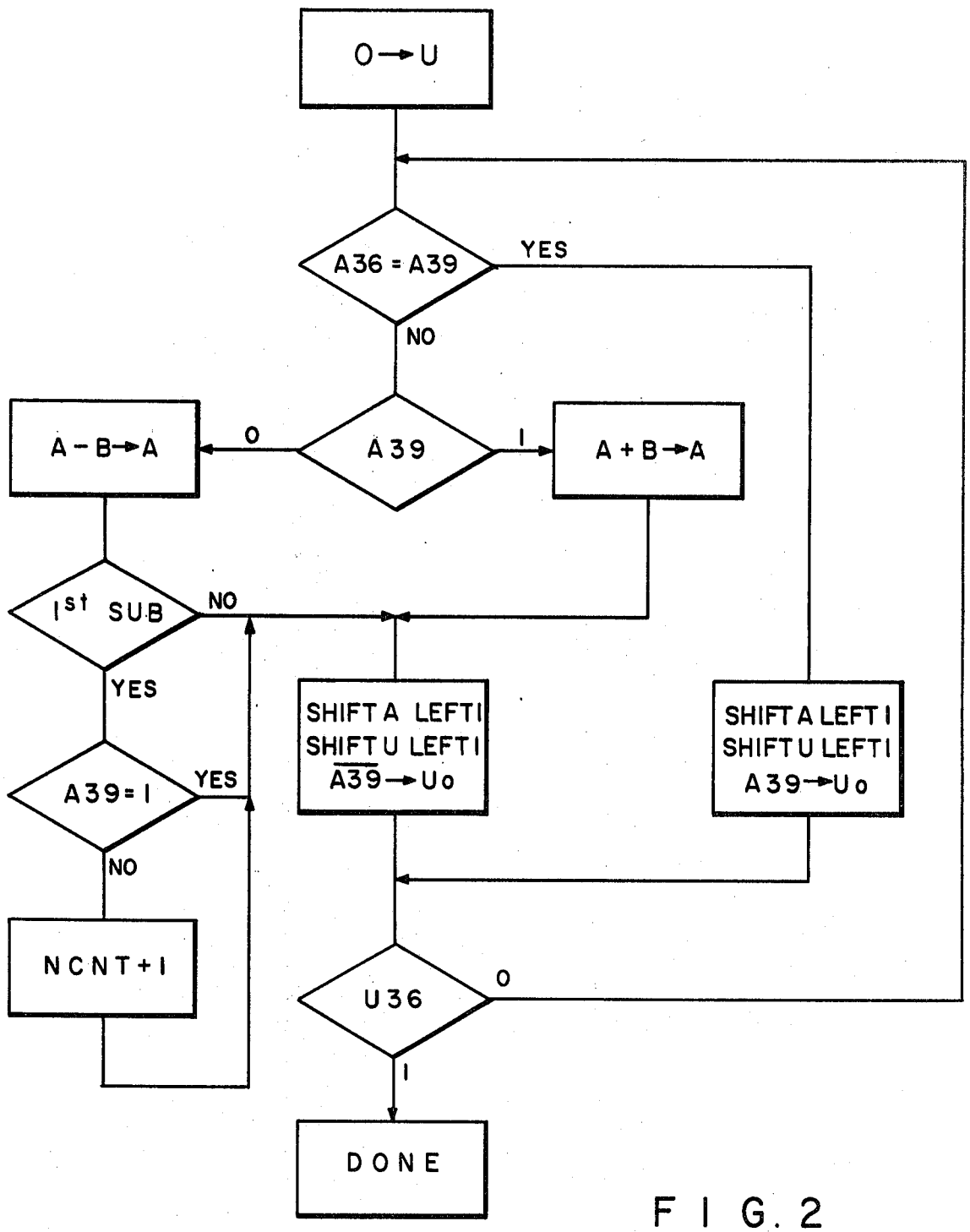
FIG. 2 is a flow chart which may be helpful in understanding the present invention.

When the indicated manipulation is a division operation, the dividend (mantissa) is loaded into the A register 46. In the exemplary embodiment, the A register was a 40 bit register and it is assumed that the binary point lies between position A36 and A37. Similarly the U register is, in the exemplary embodiment a 40 bit register with the binary point assumed to be between the positions U36 and U37. The dividend is loaded into the A register and the divisor is loaded into the B register. Then, as shown in the flow chart of FIG. 2, the U register is cleared, that is, all bits set to 0. The next step is the comparison of bit A 36 with bit A 39 which, on the first pass, should yield a "no" result. Since the mantissas have been previously normalized, there will be a logical "1" in the most significant bit position, i.e., bit A36, while the A39 position remains 0. With the A39 position at 0, the decision is made to subtract the divisor from the dividend and place the result back into the A register. If that was the first subtraction of the manipulation, then digit A39 is examined to determine if a logical 1 appears in that position. A logical 1 in bit position A39 is indicative that the divisor was larger than the dividend. If the A39 bit is a logical "1", the A register is shifted left one digit, the U register is shifted left one unit and the inversion of the A39 bit is transferred the U0 position of the U register, that is a logical 0. If, on the other hand, the A39 bit is a logical 0, the normalized counter 66 is incremented by one and then the A register and the U register are each shifted left by one and the inversion of the A39 bit, a logical 1, is stored in the U0 position. After the first subtraction and the shifting left of the A and U registers, the U36 position of the U register is examined to determine if a logical 1 is present. If not, the process is looped back to the input of the first position box where A36 and A39 are compared to determine if the remainder is such as to yield a positive remainder on the next subtraction. If "yes", both the U register and the A register are shifted left one position and the bit from A39 is transferred into the U0 position. If the comparison between A36 and A39 yielded a "no", then the A39 position is examined to determine the presence of a logical 0 or a logical 1. If a logical "1" appears in the A39 position, indicative that the last subtraction had yielded a negative remainder, the content of the B register is added to the A register and the resultant stored in the A register. The A register and the U register are then shifted to the left by one position and the inversion of the bit in the A line position is inserted into the U0 position. If a logical 0 had appeared at the A39 position, the contents of the B register, i.e., the divisor would have been subtracted from the content of the A register and the result restored to the A register. After the first subtraction, the A register is then shifted left one and U register is shifted left one position and the inversion of the content of the A register is lodged in the 0 position of U register. These procedures are repeated until a logical 1 appears at the U36 position of the U register. When the logical 1 has appeared at the 36 digit position of the U register, the division process is completed, the quotient from the U register 50 is transferred to the B register thence through the ALU 44 to the A register 46. From the A register, the resultant quotient is transferred to the input of the K register 64 as is the count from the normalize counter 66. The count in the normalize counter may be used to adjust the exponent if necessary in accordance with the manipulation of the mantissas. The quotient from the divided mantissas is then combined in the ALU 12 with the result of the manipulation of the exponents to provide a composite answer as hereinbefore stated.

Thus, it may be seen that there has been provided, in accordance with the present invention, an improved apparatus and method for accomplishing floating point divisional activity without the use of a preset counter to determine the completion of the divisional process and which provides a simplified and expeditious manipulation of the values to accomplish this division.

The embodiments of the invention in which an exclusive property or privilege is claimed are defined as follows:

1. In a computational apparatus having a first and a second microprocessor unit for performing floating point calculations, a method of effecting a floating point division comprising:
   manipulating exponent portions of values in said first microprocessor unit;
   simultaneously therewith, manipulating normalized mantissa portions of the values in said second microprocessor unit; including
   storing the dividend mantissa in a first register;
   storing the divisor mantissa in a second register;
   performing a step-by-step division of said dividend mantissa by said divisor mantissa;
   inserting the quotient bit resulting from each step in the least significant bit position of a third register and shifting that bit one position toward the most significant bit position on each successive step; and
   terminating the division operation when a logical "1" appears in the most significant bit position of the third register.

* * * * *